(12) United States Patent
Kitchel

(10) Patent No.: US 8,171,707 B2
(45) Date of Patent: May 8, 2012

(54) CORN STALK ROLLERS

(75) Inventor: Brandon Kitchel, Richmond, IN (US)

(73) Assignee: Kitchel Enterprises, LLC, Richmond, IN (US)

( * ) Notice: Subject to any disclaimer, the term of this patent is extended or adjusted under 35 U.S.C. 154(b) by 0 days.

(21) Appl. No.: 12/931,129

(22) Filed: Jan. 25, 2011

(65) Prior Publication Data

US 2011/0179758 A1 Jul. 28, 2011

Related U.S. Application Data

(60) Provisional application No. 61/336,661, filed on Jan. 25, 2010.

(51) Int. Cl.
*A01D 45/02* (2006.01)

(52) U.S. Cl. .............................. 56/52; 56/504

(58) Field of Classification Search ............ 56/52, 504, 56/500, 192, 103, 94, 63; 172/554, 518, 172/515; 171/58
See application file for complete search history.

(56) References Cited

U.S. PATENT DOCUMENTS

| | | | | |
|---|---|---|---|---|
| 1,680,218 A * | 8/1928 | Keune | ......................... | 56/52 |
| 2,823,510 A * | 2/1958 | Grasswick | ................... | 56/192 |
| 3,488,929 A * | 1/1970 | Hale | ............................ | 56/1 |
| 3,513,645 A * | 5/1970 | Garrett et al. | .................. | 56/1 |
| 3,517,490 A * | 6/1970 | Mathews | ..................... | 56/13.5 |
| 3,638,406 A * | 2/1972 | Scherer et al. | .................. | 56/14.9 |
| 4,075,822 A * | 2/1978 | Heckley et al. | .............. | 56/16.4 C |
| 4,144,698 A | 3/1979 | Shelton | | |
| 4,350,207 A * | 9/1982 | Ben-Dor | .................... | 171/58 |
| 4,524,571 A * | 6/1985 | Mak et al. | ....................... | 56/98 |
| 4,603,916 A * | 8/1986 | Granryd | ....................... | 301/45 |
| 5,103,624 A * | 4/1992 | Marshall | ...................... | 56/192 |
| 5,255,500 A * | 10/1993 | von Allwoerden | ............. | 56/63 |
| 6,101,800 A * | 8/2000 | Juraco et al. | ................... | 56/504 |
| 6,374,587 B1 * | 4/2002 | Wubbels et al. | ............... | 56/103 |
| 6,539,697 B2 * | 4/2003 | Burk | .............................. | 56/504 |
| 6,968,907 B1 * | 11/2005 | Raper et al. | .................. | 172/518 |
| 2010/0071335 A1 * | 3/2010 | Poeylaut | ........................ | 56/94 |

FOREIGN PATENT DOCUMENTS

| | | | |
|---|---|---|---|
| CN | 1810076 A | * | 8/2006 |
| DE | 3713025 A1 | * | 10/1988 |
| EP | 453852 A | * | 10/1991 |

* cited by examiner

*Primary Examiner* — Arpad Fabian-Kovacs

(74) *Attorney, Agent, or Firm* — Clifford W. Browning; Krieg DeVault LLP

(57) ABSTRACT

Corn stalk rollers, comprising a plurality of roller assemblies pivotally mounted to and spanning the corn head of a corn harvest combine; an apparatus to bias the plurality of roller assemblies into contact with the ground while the corn harvest combine is harvesting corn; and chevron-patterned protrusions on each of the plurality of roller assemblies for providing ground traction and for aiding in crushing harvested corn stalks to ground level corn-field-wide.

3 Claims, 10 Drawing Sheets

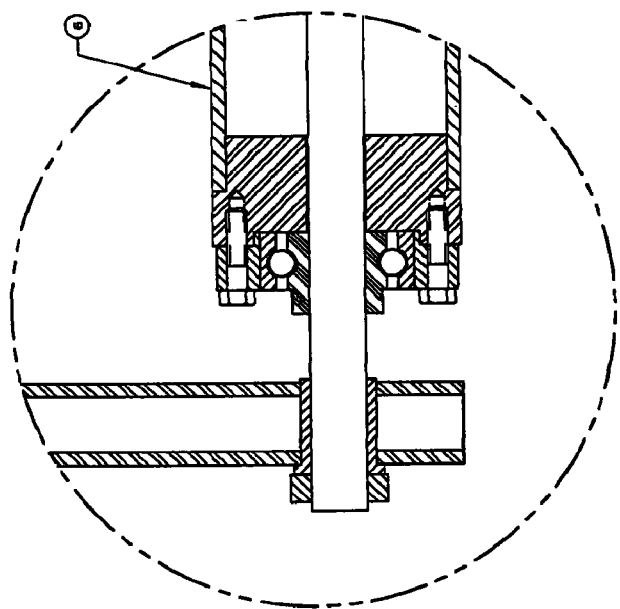
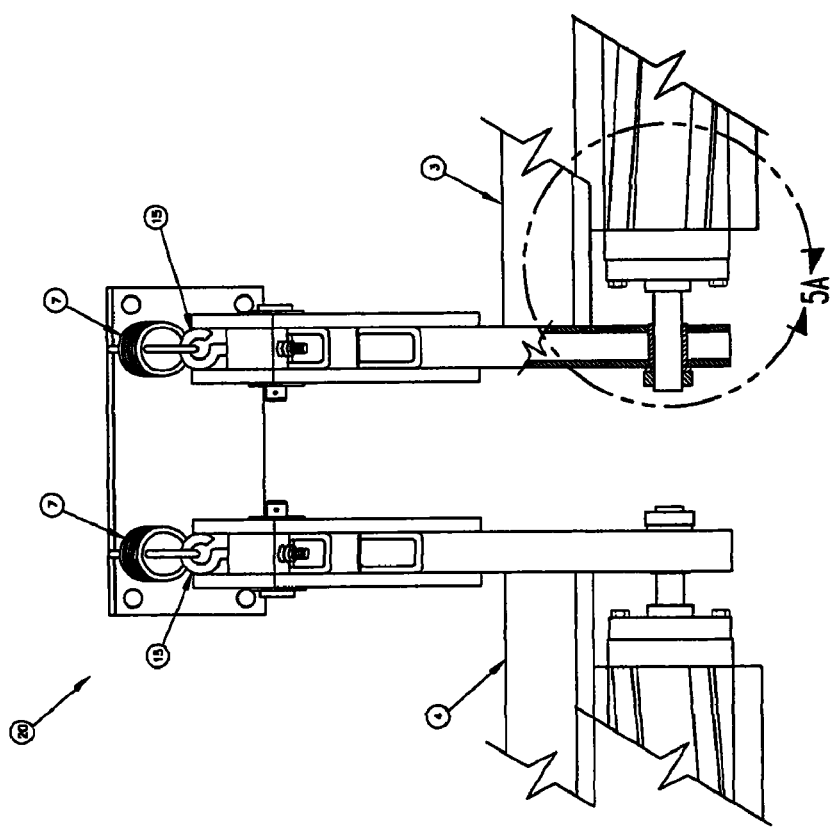
Fig. 5A
Fig. 5

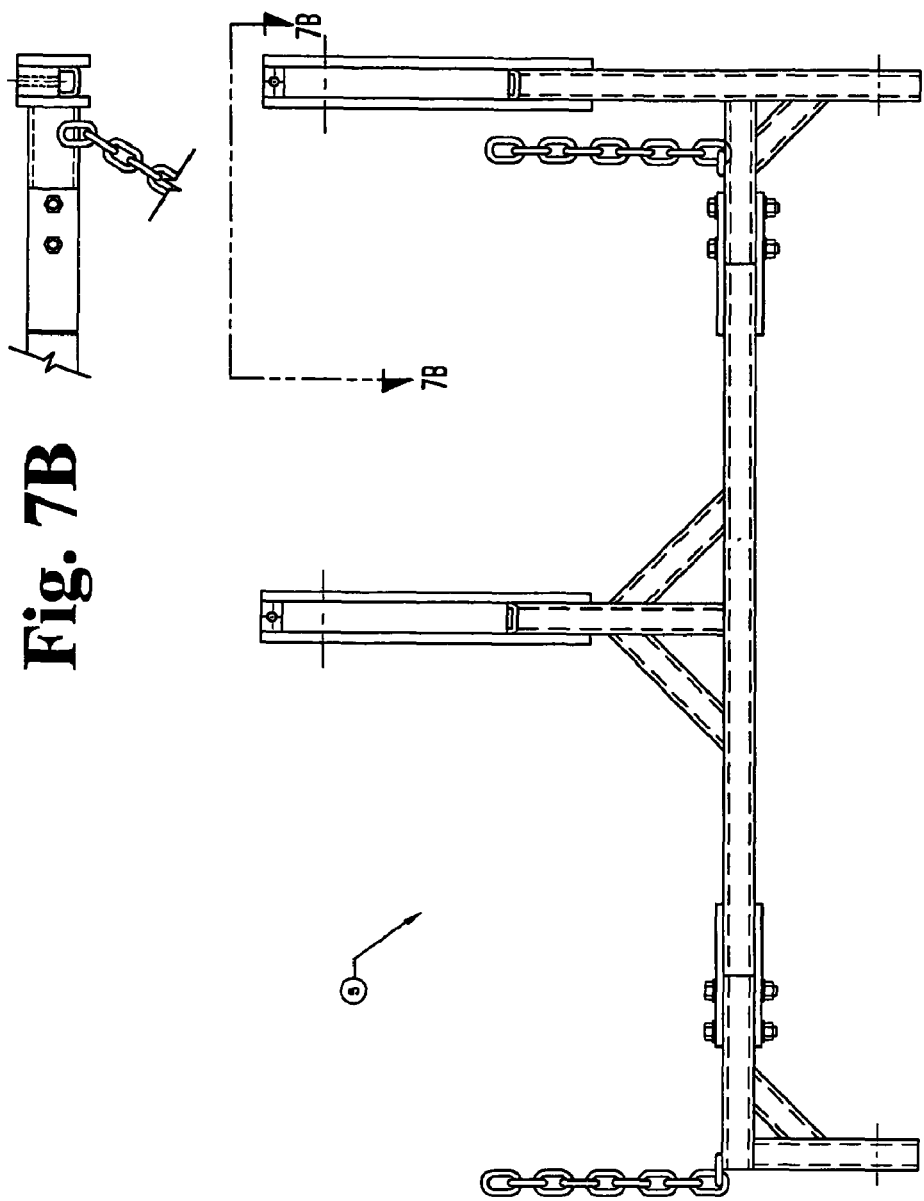
Fig. 7B  Fig. 7A  Fig. 7C

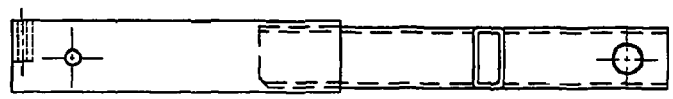
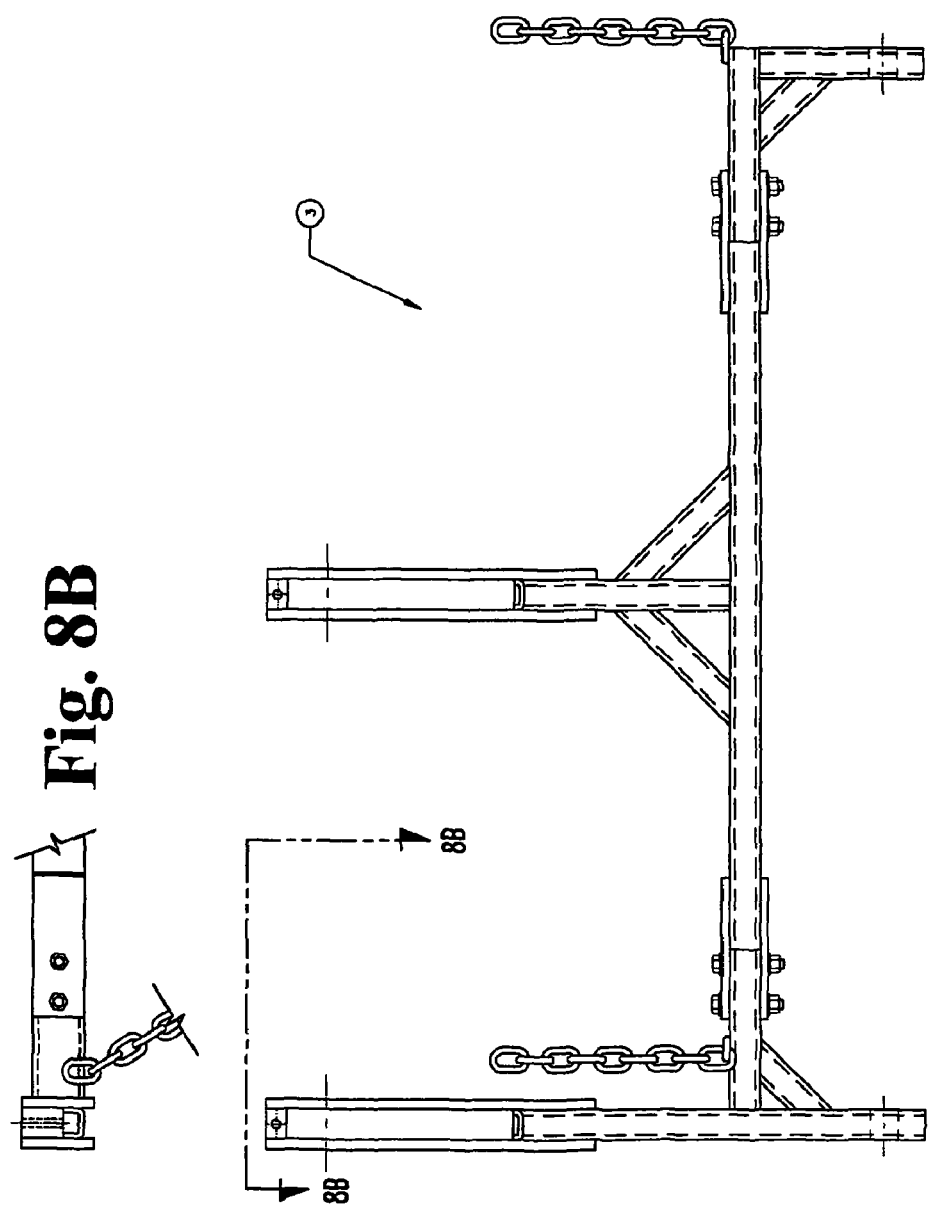
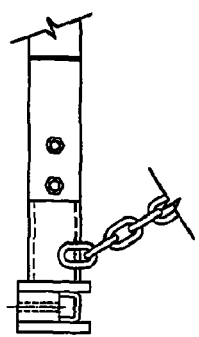

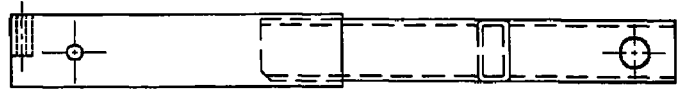
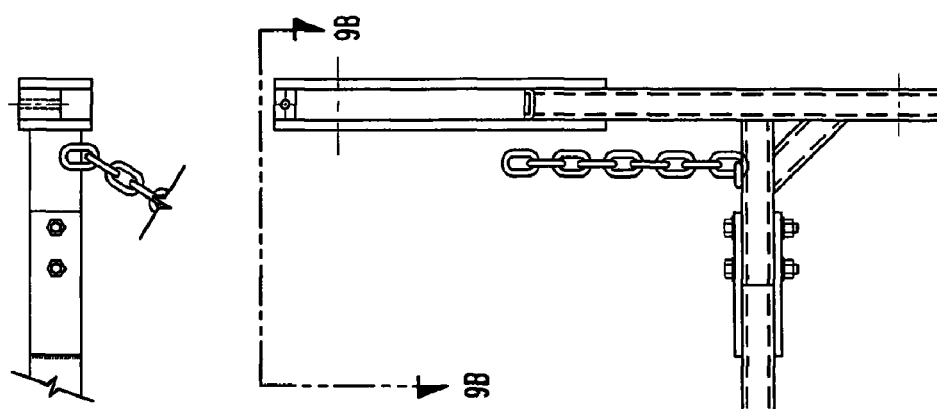
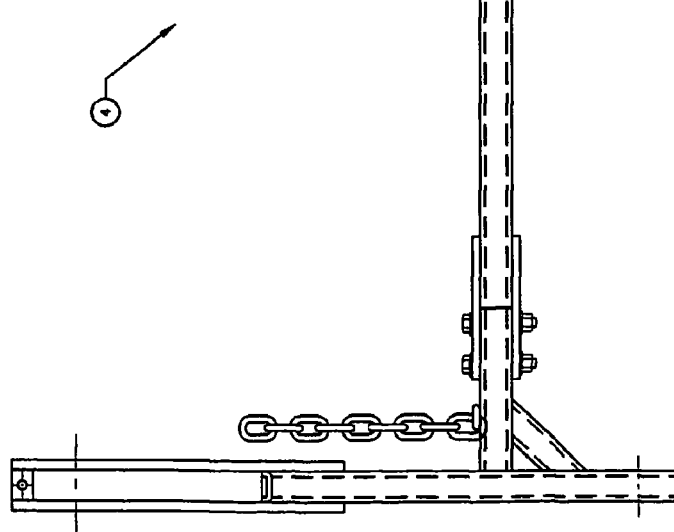
Fig. 9C
Fig. 9B
Fig. 9A

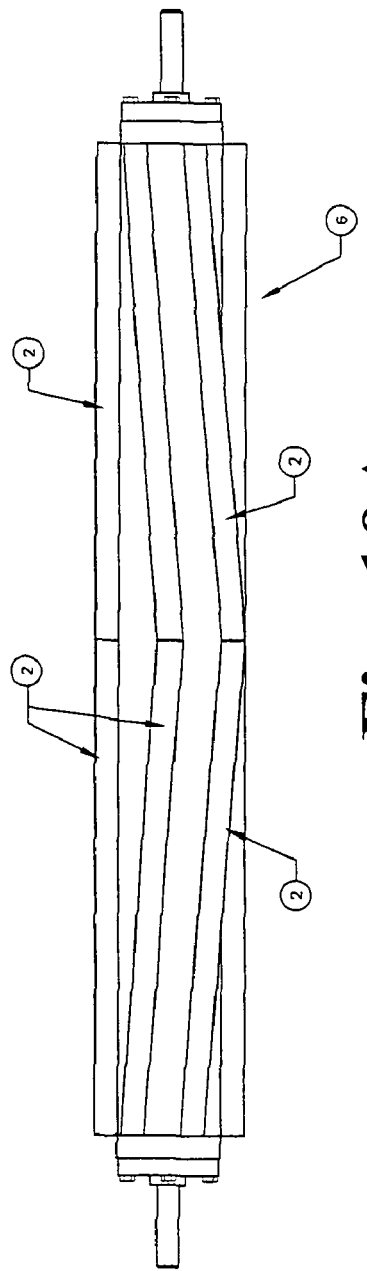
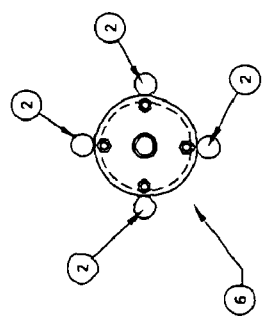
Fig. 10A
Fig. 10B

CORN STALK ROLLERS

The present application claims the benefit of U.S. Provisional Patent Application Ser. No. 61/336,661, filed Jan. 25, 2010.

The present invention relates generally to farm equipment, and more particularly relates to a novel attachment for a corn harvester combine.

BACKGROUND OF THE INVENTION

With the improvements to corn genetics in the past decades, corn stalks have become extremely tough and far more damaging to farm equipment, and in particular far more damaging to farm equipment tires. Farm equipment is very expensive, so it is important for farmers to prolong the quality of their capital investments, and the extremely tough, genetically-modified corn stalks have become an unwelcomed threat to the longevity of farm equipment.

The tougher corn stalks have also required extra horsepower from corn harvester combines to shred the tougher corn stalks. This not only results in extra fuel being used by the corn harvester combine, but it also results in slower ground speeds of the combine while harvesting. One alternate option has been to shred the tougher corn stalks with mowing machinery after the harvest, but this option requires an extra tractor, extra fuel, extra equipment wear, and precious time.

Shredded corn stalks and fodder from the tougher corn stocks have also become more susceptible to being moved around the field by wind and water thereby disrupting the even laying of the stalks on the field by the combine during harvesting. This has caused thick mats of shredded stalks and fodder to gather in some areas of the harvested field, while leaving exposed ground in others. While the shredded stalks and fodder are biodegradable and beneficial to the soil, too much in one area also causes wet spots to appear in the field.

Existing options for dealing with the tougher corn stocks also leave the first few inches of the corn stalk at ground level sticking upright and exposed, and it is the bottom part of the stalk closest to ground level that is the toughest of all, and most likely to cause damage to farm tires. Many tires for corn harvester combines cost over $1,500.00 per tire to replace.

The corn stalk rollers of the present invention overcome all of these problems.

SUMMARY OF THE INVENTION

One embodiment of the present invention are corn stalk rollers, comprising a plurality of roller assemblies pivotally mounted to the corn head of a corn harvest combine; an apparatus to bias the plurality of roller assemblies into contact with the ground while the corn harvest combine is harvesting corn; and chevron-patterned protrusions on each of the plurality of roller assemblies for providing ground traction and for aiding in crushing harvested corn stalks to ground level.

Another embodiment of the present invention are corn stalk rollers, comprising a plurality of roller assemblies pivotally mounted to the corn head of a corn harvest combine; an apparatus to bias the plurality of roller assemblies into contact with the ground while the corn harvest combine is harvesting corn; and chevron-patterned protrusions on each of the plurality of roller assemblies for providing ground traction and for aiding in crushing harvested corn stalks to ground level, wherein the apparatus to bias the plurality of roller assemblies into contact with the ground, includes a plurality of stationary mounting arms affixed to the corn head of a corn harvest combine, a plurality of pivot arm assemblies pivotally attached to the stationary mounting arms in which the plurality of roller assemblies are rotationally captured, and a plurality of expansion springs attached to the plurality of stationary mounting arms and to the plurality to pivot arm assemblies and straddling the pivotal attachment of the pivot arm assemblies to the stationary mounting arms.

Yet another embodiment of the present invention are corn stalk rollers, comprising a plurality of roller assemblies pivotally mounted to the corn head of a corn harvest combine; an apparatus to bias the plurality of roller assemblies into contact with the ground while the corn harvest combine is harvesting corn; and chevron-patterned protrusions on each of the plurality of roller assemblies for providing ground traction and for aiding in crushing harvested corn stalks to ground level, wherein the apparatus to bias the plurality of roller assemblies into contact with the ground, includes a plurality of stationary mounting arms affixed to the corn head of a corn harvest combine, a plurality of pivot arm assemblies pivotally attached to the stationary mounting arms in which the plurality of roller assemblies are rotationally captured, and a plurality of expansion springs attached to the plurality of stationary mounting arms and to the plurality to pivot arm assemblies and straddling the pivotal attachment of the pivot arm assemblies to the stationary mounting arms, and wherein the chevron-patterned protrusions on each one of the plurality of roller assemblies are ⅝ inch rebars.

BRIEF DESCRIPTION OF THE DRAWINGS

FIG. 5 is a front view of a double stationary mounting arm for a John Deer brand corn harvester combine for the pivot arm assemblies of the preferred embodiment of the cornstalk rollers of the present invention.

FIG. 5A is a sectional view of FIG. 5 taken along line 5A.

FIG. 7A is an enlarged view of the left hand pivot arm assembly of FIG. 1.

FIG. 7B is a sectional top view of FIG. 7.

FIG. 7C is a left hand view of FIG. 7A.

FIG. 8A is an enlarged view of the right hand pivot arm assembly of FIG. 1.

FIG. 8B is a sectional top view of FIG. 8A.

FIG. 8C is a right hand view of FIG. 8A.

FIG. 9A is an enlarged view of the center pivot arm assembly of FIG. 1.

FIG. 9B is a sectional top view of FIG. 9A.

FIG. 9C is a right hand view of FIG. 9A.

FIG. 10A is an enlarged front view of a roller assembly of FIG. 1.

FIG. 10B is an end view of FIG. 10A.

DETAILED DESCRIPTION OF A PREFERRED EMBODIMENT

Figure 2A:
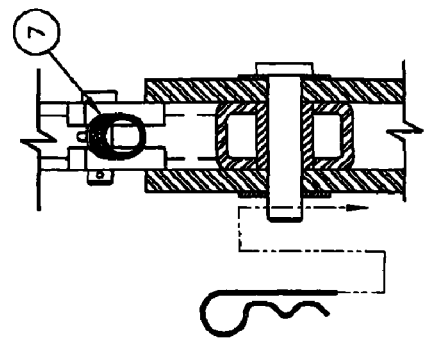
FIG. 2A is sectional view of FIG. 2 taken along line 2A-2A.
Figure 2:
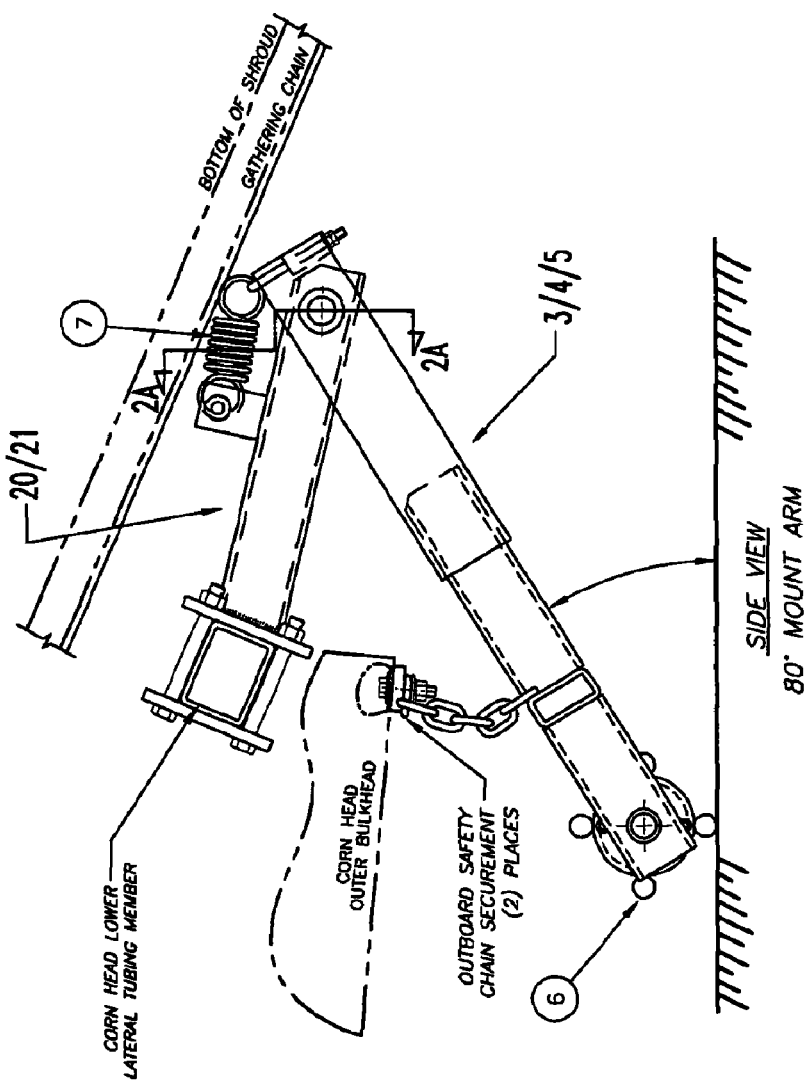
FIG. 2 is a side view of the mounting arm and pivot arm assembly of the preferred embodiment of the cornstalk rollers of the present invention.
Figure 4:
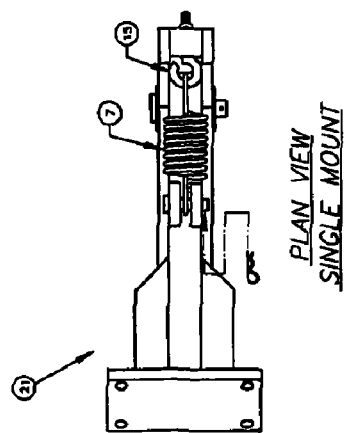
FIG. 4 is a plan view of a single stationary mounting arm for a John Deer brand corn harvester combine for the pivot arm assemblies of the preferred embodiment of the cornstalk rollers of the present invention.
Figure 3:
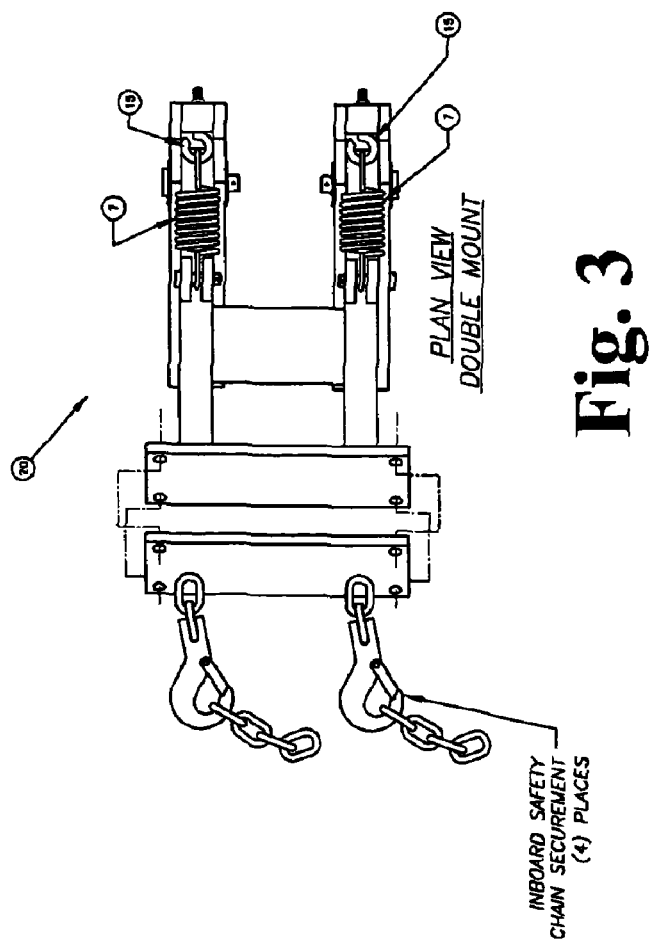
FIG. 3 is a plan view of a double stationary mounting arm for a John Deer brand corn harvester combine for the pivot arm assemblies of the preferred embodiment of the cornstalk rollers of the present invention.

Turning now to the Drawings, the corn stalk rollers (1) of the present invention (see FIG. 11) are removably attachable to the corn head lower lateral tubing structure of any corn harvester combine (see FIG. 2), which places the corn stalk rollers (1) of the present invention ahead of the combine's front tires, and which places ahead of the combines' front tires the steel roller assemblies (6) of the corn stalk rollers (1) that crush corn stocks and fodder to the ground as the corn harvester combine harvests corn from the field. The roller assemblies (6) require no extra horsepower from the combine's engine to work for their intended purposes, which saves fuel and results in faster ground speeds of the combine during harvesting. Down pressure extension springs (7) provide extra downward pressure to the roller assemblies (6) to aid them in keeping contact with the ground and in crushing the upright corn stalks down to ground level and keeping them there. The chevron pattern illustrated on the preferred embodiments of the roller assemblies (6) of the preferred embodiment are made of ⅝" rebar (2) that is welded in a chevron pattern to the outer surface of the roller assemblies (6), which makes it easy to form the desired chevron pattern. The spiraled ⅝ inch steel rebar (2) of the preferred embodiment has proven to provide traction for the roller assemblies (6) to keep the roller assemblies (6) from slipping or skipping along the ground, and also to aid in crushing upright corn stalks. By smashing the upright corn stalks to the ground, the decomposing lifespan of the corn stalks is a lot shorter than if the corn stalks were left standing, and shortening the decomposing time line is always crucial in no-till farming.

The corn stalk rollers (1) of the present invention thus protect farm tires from being damaged by upright corn stalks, and they save fuel by working while corn is being harvested, which eliminates the need to make a separate pass of the corn field after harvest.

Without using the corn stalk rollers (1) of the present invention, corn fields have an uneven distribution of shredded corn stalks and fodder, and tire-harmful upright stalks are left standing at ground level, which can cause tire damage. After using the corn stalk rollers (1) of the present invention, corn fields look clean and uniform, and the corn stocks are crushed to ground level and are ready to decompose uniformly to enrich the soil in the entire corn field.

A first embodiment of the corn stalk rollers (1) of the present invention utilized a single continuous roller assembly that would cover six corn rows on 30" centers. However, the single roller assembly proved to be uneven in its ground contact when the corn harvester traversed slopes in the corn field, or when the single roller assembly ran over rocks in the field. A continuous roller assembly also required a longer installation time on corn harvest combines than does the plurality of roller assemblies (6) of the preferred embodiment of the corn stalk rollers (1) of the present invention.

Figure 1:
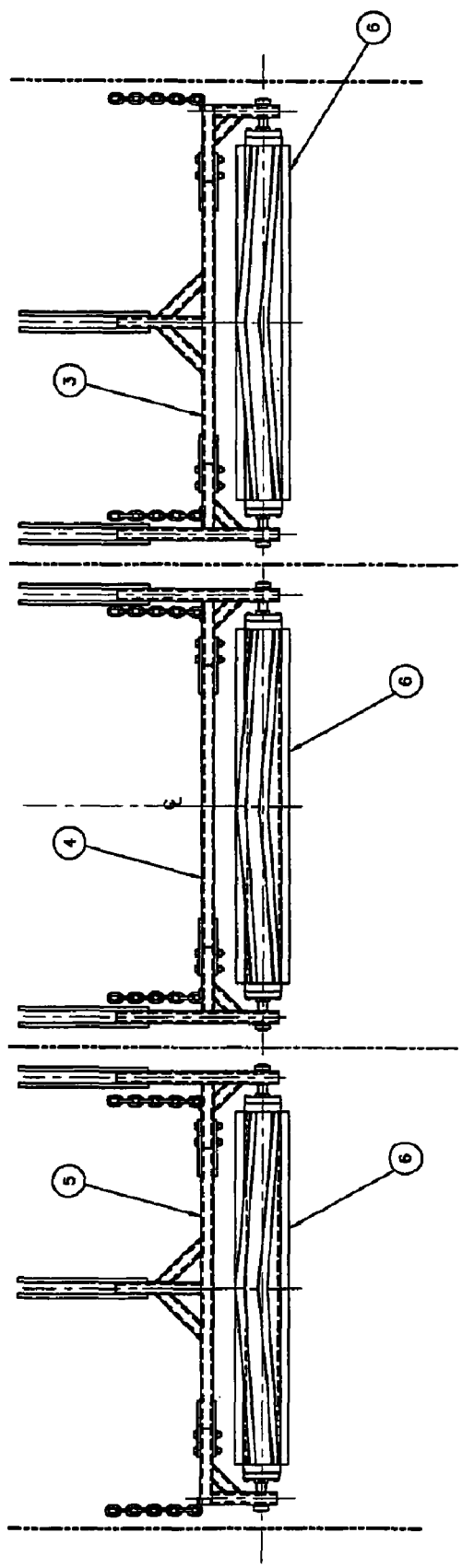
FIG. 1 is view of the preferred embodiment of the cornstalk rollers of the present invention mounted on their pivot arm assemblies as they would be viewed from the cab of a corn harvester combine without the combine's corn head being shown.
Figure 6:
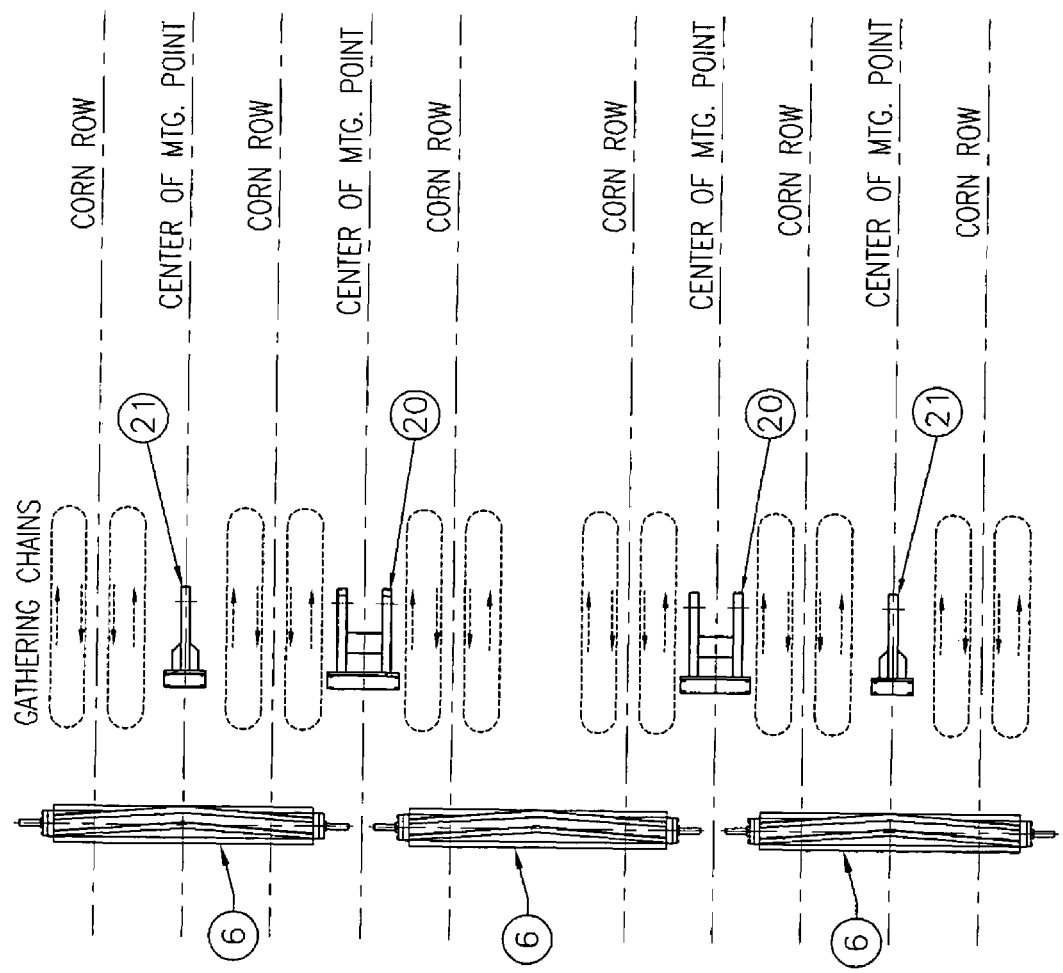
FIG. 6 is schematic view of the positioning of the single and double stationary mounting arms and three 44 inch rollers assemblies of the preferred embodiment of the cornstalk rollers of the present invention as they would be mounted on a John Deer brand corn harvester combine arranged to harvest corn rows on 30 inch centers, and illustrating their positioning vis-a-vis the gathering chains of the corn head of the corn harvest combine.
Figure 11:
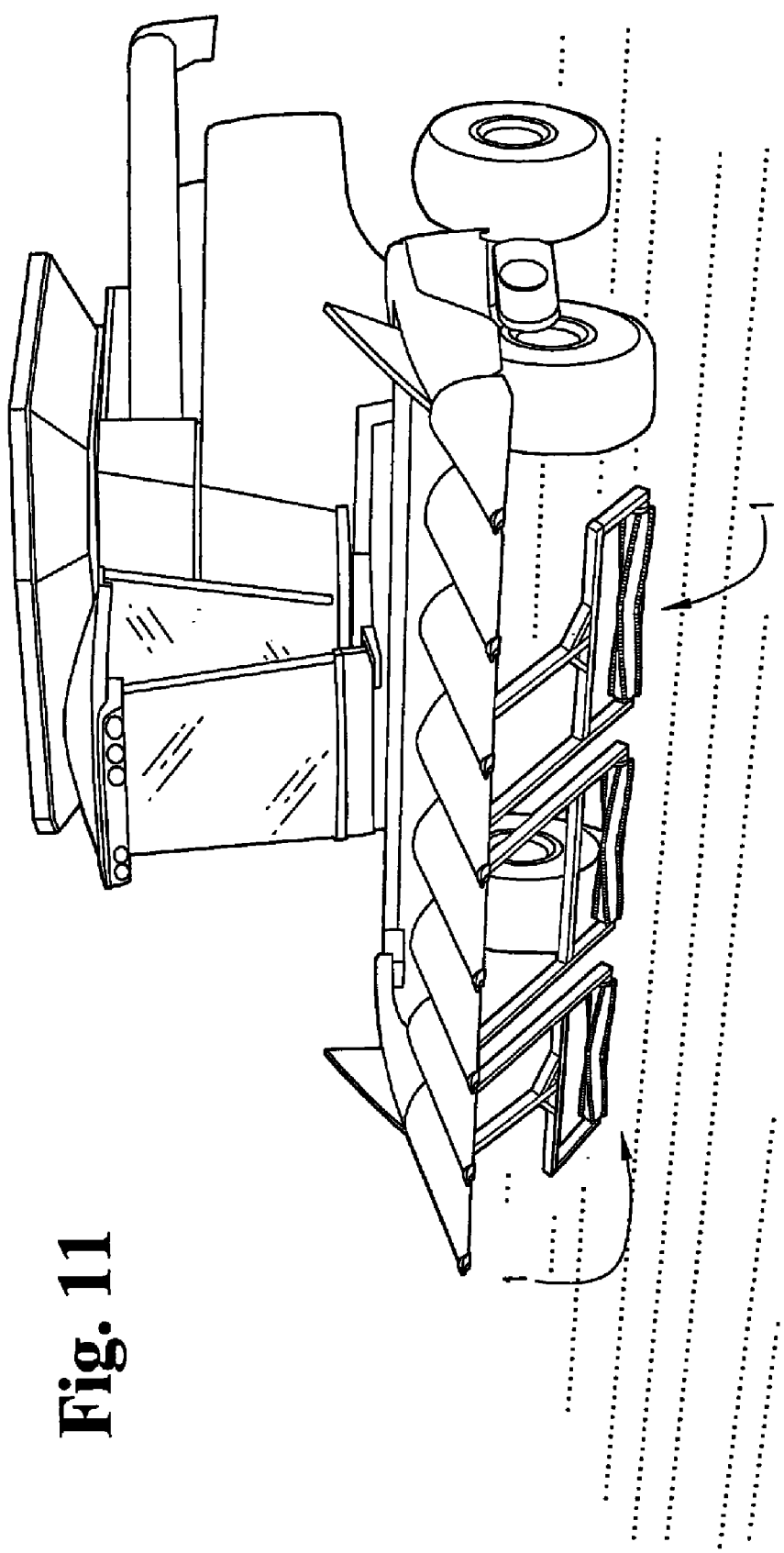
FIG. 11 is a frontal perspective view of the corn stalk rollers of the present invention mounted to the corn head of a John Deere brand corn harvest combine.

FIGS. 1 and 11 illustrate the preferred embodiment of the corn stalk rollers (1) of the present invention, which uses three independent roller assemblies (6), each of which is constructed of steel tubing approximately 44 inches long, which enables each of the three roller assemblies (6) to span two corn rows on 30 inch centers (see FIG. 6). Now, if one of three roller assemblies (6) runs over a rock, it only affects one roller assembly (6), while the other two roller assemblies (6) remain in contact with the ground. Having three roller assemblies (6) also makes installation of the three individual roller assemblies to the corn harvester combine much easier.

The outside roller assemblies (6) of the preferred embodiment use the same pivot arm assembly (3, 5) design, each having a step out at their outer most ends to accommodate the roller assemblies (6). The middle of each outer pivoting arm assembly (3, 5) is pivotally attached to a single stationary mounting arm (21) that is affixed to the corn head lower lateral tubing member of the corn harvester combine (see FIG. 2). The inner ends of the pivot arm assemblies (3,5) and the outer ends of the central pivot arm assembly (4) are all pivotally attached to double stationary mounting arms (20) that are affixed to the corn head lower lateral tubing member of the corn harvester combine (see FIG. 2). Also in the preferred embodiment, down force pressures on the roller assemblies (6) is accomplished with the use of expansion springs (7) that are attached to the stationary mounting arms (20, 21) and to the pivot arm assemblies (3, 4, 5), thereby straddling the pivotal attachment point of the pivot arm assemblies (3, 4, 5) to the stationary mounting arms (20, 21) (see FIG. 2). The down force pressure of the expansion springs (7) is adjustable with adjustable eye bolts (15) to give the roller assemblies (6) optimal down force pressures for any type of conditions.

The design of the preferred embodiment of the corn stalk rollers (1) of the present invention is easy to build, requires less material to make, yet accomplishes the goal of smashing corn stalks to ground level. The roller assemblies' (6) bearings of the preferred embodiment are also placed inside the roller assemblies (6) with a continual main bearing shaft supporting them (see FIG. 5A). This eliminates external bearing damage that could be caused by rocks or other corn field debris.

The preferred embodiment of the corn stalk rollers (1) of the present invention will require slightly different stationary mounting brackets (20, 21) for the differing corn heads of the various brands and models of corn harvest combines currently in use. The preferred embodiment of the present invention is illustrated with a John Deere brand corn harvesting combine. The roller assemblies (6) may also be varied in width to accommodate narrow or wider corn row plantings than the typical 30 inches on center planting pattern as illustrated in the Drawings.

The corn stalk rollers (1) of the present invention may also remain on the corn head of the corn harvest combine when the corn head is set unto a trailer for transportation. This saves costly time by eliminating the need to unhook and reattach the corn stalk rollers (1) of the present invention to the corn harvest combine with every use.

I claim:

1. Corn stalk rollers, comprising
   a plurality of roller assemblies pivotally and removably mounted across the corn head lower lateral tubing structure of a corn harvester combine whereby the roller assemblies are mounted to the corn harvester combine ahead of the front tires of the combine;
   means to bias the plurality of roller assemblies into contact with the ground while the corn harvester combine is harvesting corn in a corn field; and chevron-patterned protrusions spanning the widths of each of the roller assemblies to provide ground traction and to aid in crushing harvested corn stalks to ground level whereby when the corn harvester combine has completed the harvest of the entire corn field all harvested corn stalks in the corn field have been uniformly crushed to ground level by the plurality of roller assemblies.

2. The corn stalk rollers of claim 1, wherein the means to bias the plurality of roller assemblies into contact with the ground includes a plurality of stationary mounting arms affixed to the corn head lower lateral tubing structure of the corn harvester combine, a plurality of pivot arm assemblies pivotally attached to the stationary mounting arms in which the plurality of roller assemblies are rotationally captured, and a plurality of expansion springs attached to the plurality of stationary mounting arms and to the plurality to pivot arm assemblies and straddling the pivotal attachment of the pivot arm assemblies to the stationary mounting arms.

3. The corn stalk rollers of claim 1, wherein the chevron-patterned protrusions on each one of the plurality of roller assemblies are ⅝ inch rebars.

* * * * *